3,484,651
OVERLOAD CONTROL FOR SILICON DIODES IN
RESISTANCE WELDERS AND THE LIKE
Joseph J. Riley, 409 Kenilworth Ave. SE.,
Warren, Ohio 44483
Filed Oct. 6, 1966, Ser. No. 584,723
Int. Cl. H02h 5/00, 7/00, 3/00
U.S. Cl. 317—22                                    13 Claims

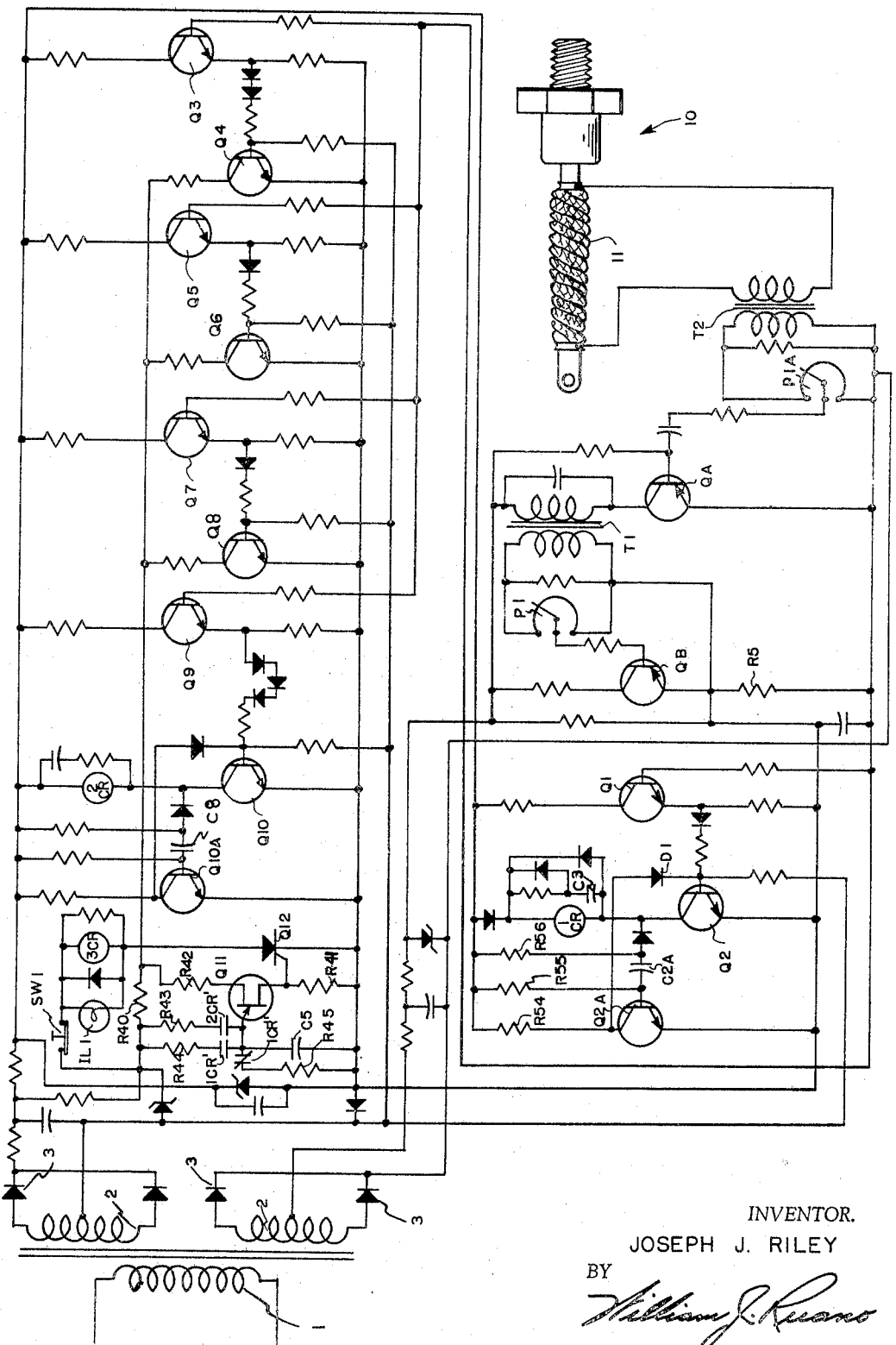

ABSTRACT OF THE DISCLOSURE

An overload control system for resistance welding circuits and the like embodying an intermittent duty power source which includes a semiconductor, such as a solid state silicon rectifier. To prevent excess junction temperature of said rectifier, the value of current flow therethrough is estimated and then compared to a preset time which will not allow abnormal junction temperature. If the length of the time pulse selected by the weld timer is less then the preset time, nothing happens, but if greater, a safety device operates the Ignitron contactor to prevent further flow of current.

---

This invention relates to an overload control system for welding circuits or other circuits embodying intermittent duty of a power source and, more particularly, for monitoring the flow of current through the silicon rectifiers of a power pack and for protecting the rectifiers from burnout or damages as the result of excessive levels of current flowing therethrough for a predetermined period of time.

A primary object of the invention is to provide a practical method of monitoring the current flow through a semiconductor, such as a solid state silicon rectifier, and to interrupt said current flow or signal the presence of an overload condition if the current rises above and remains above a predetermined level for a specified length of time.

A further object of the invention is to provide a method of monitoring said current flow and interrupting the same after successively shorter periods of time if said current level exceeds successively higher predetermined levels.

Another object of the invention is to provide a current monitoring device which may be used with the silicon rectifiers of resistance welding equipment for interrupting current flow therethrough in response to various current-time conditions of overload involving progressively higher current values for progressively shorter periods of time.

Other objects and advantages of the invention will become more apparent from a study of the following description taken with the accompanying drawing wherein:

The single figure is a schematic circuit diagram of a resistance welding circuit including silicon rectifiers in the power pack which are protected from overloading, in accordance with the principles of the present invention.

Silicon rectifiers or diodes, in power sizes of the order of 275 amperes rating, are used in power packs for resistance welding service. Experience has shown that long weld times at maximum current output tend to burn out such rectifiers and destroy the pack. However, to make such welders practical both as to size of equipment and cost, it is necessary to operate them at levels of current far in excess of their steady state or continuous rating. But this can be done only for limited periods.

Silicon rectifiers have a thermal capacity that must not be exceeded to avoid damage. On an intermittent basis, the magnitude of current and its time of flow must be selected so that the internal junction temperature does not exceed a specific maximum temperature, such as, for example, 200° C., otherwise permanent damage or possible catastrophic failure will occur. Furthermore, the failure of a silicon rectifier may cause damage to occur in other parts of the circuitry of the equipment, thus necessitating costly shutdowns.

As long as the temperature of the internal junction of the silicon rectifier remains below a specific maximum level, the rectifier will operate properly even if the continuous rating is greatly exceeded, provided that such overload occurs only for a limited time.

In accordance with the present invention, the value of the current flow is estimated and then compared to a preset time which will not allow excess junction temperature of the silicon rectifier at such level of current. If the length of pulse selected by the weld timer is less than the preset time, nothing happens. If the length is greater, a safety device operates which is connected into the Ignitron contactor section to open the contactor and prevent further flow of current. Also a lamp lights up which indicates that physical reset is necessary after adjustments to prevent overload recurrence.

In the average resistance welding application, the time of the current pulse ranges from approximately 5 to 90 cycles. Therefore, in accordance with the present invention, five overload conditions have been arbitrarily selected within such range with progressively increasing peak currents occurring for progressively decreasing time periods although it should be understood that more or less than 5 overload conditions at other peak current and time values may be selected instead. More specifically, expressing timing functions in cycles with 60 cycles as the base, the overload control relay in the circuit to be described is actuated to interrupt current flow through the silicon rectifier if any of the following 5 overload conditions should occur: (1) 1200 amperes for 90 cycles; (2) 1450 amperes for 60 cycles; (3) 1700 amperes for 45 cycles; (4) 1950 amperes for 30 cycles; or (5) 2200 amperes for 2 cycles.

Referring more particularly to the drawing, a circuit is shown for protecting the silicon rectifier power pack from burnout due to overloading. The circuit consists, generally, of a signal pickup, which is indicative of current flow through the rectifier, an audio amplifier, and a group of five trigger circuits, fed by the output of said amplifier, for actuating an overload control relay as the result of various combinations of weld current and weld time.

The circuit will be first described in general terms and thereafter will be described more specifically in order to make it more readily understood.

Primary winding 1 of a transformer, is connected to a 115 v. A.C. source. Secondary windings 2 are connected to rectifiers 3 to provide a source of D.C.

A signal which varies with the rectifier current is picked up across the anode lead 11 of one of the power diodes 10 in the power pack. This signal is then fed into the amplifier consisting of transistors QA and QB. Transistor Q1 conducts when the power diode peak current reaches 1200 amps. Conduction of transistor Q1 causes transistor Q2 to saturate, and relay 1CR is actuated. As a result, condenser C5 in the emitter circuit of unijunction transistor Q11 starts to charge through resistor R44. The time constant of the C5–R44 charging circuit is such that if the signal lasts for more than 90 cycles, unijunction transistor Q11 will fire and trigger the silicon controlled rectifier Q12. Overload control relay 3CR will then actuate and remove power from the pack. Relay 3CR is provided with suitable contacts, not shown, in the circuits providing current to silicon diode 10 to interrupt this circuit when an overload condition exists. Normally closed pushbutton reset switch SW1 is in series with the coil of relay 3CR.

If the signal duration is less than 90 cycles, transistor Q11 will not fire and condenser C5 will discharge through resistor R45 when relay 1CR is deactuated. Relay 1CR will deactuate whenever the output signal of the amplifier drops below 1.9 volts.

When the peak diode current exceeds 1450 amperes, the above action is repeated. In addition, transistor Q3 will also conduct causing transistor Q4 to saturate. Now, in addition to condenser C5 charging, the base 2 voltage of unijunction transistor Q11 is lowered due to the increased voltage drop across resistor R40. Unijunction transistor Q11 will now fire if the signal duration at this level exceeds 60 cycles. When unijunction transistor Q11 fires, the action of transistor Q12 and relay 3CR is the same as described above.

It should be noted that for each succeeding triggering action described, all of the previously described trigger actions take place also. Therefore, when the maximum signal level is reached, all of the trigger circuits, Q1 through Q10, will be conducting.

As the peak diode current reaches 1700 amperes, transistor Q5 is forced to conduct, causing transistor Q6 to saturate. This causes a still larger voltage drop across resistor R40, thus lowering the base 2 voltage of unijunction transistor Q11 even further. Unijunction transistor Q11 will now fire if the signal duration exceeds 45 cycles. Transistor Q12 is again triggered actuating relay 3CR.

If the peak diode current reaches 1950 amperes, the signal level will be sufficient to cause transistor Q7 to conduct which forces transistor Q8 to saturate. The base 2 voltage of unijunction transistor Q11 is now lowered sufficiently to fire unijunction transistor Q11 with a signal time of 30 cycles.

Should the peak diode current exceed 2200 amperes, transistor Q9 also conducts causing transistor Q10 to saturate. Relay 2CR is then actuated and condenser C5 charges through the parallel combination of resistors R44 and R43. Unijunction transistor Q11 will now fire in approximately 2 cycles. This will actuate overload control relay 3CR and deenergize diode 10.

DETAILED OPERATION OF THE CIRCUIT

In the drawing, reference numeral 10 generally designates a silicon rectifier having an anode lead 11. When a current passes through the silicon rectifier 10, a voltage signal proportional to the current in amplitude is generated across the primary of transformer T2 due to the resistance of anode lead 11 which may be in the order of approximately 30 micro ohms. This signal is amplified by a transistorized amplifier comprising transformer T2, transistor QA, transformer T1, and transistor QB. The output level of the amplifier section is adjusted by potentiometers P1 and P1A to provide for conduction of transistor Q1 when the power diode peak current reaches 1200 amperes. The resulting output signal (1.9 v.) of the amplifier is a positive half cycle sine wave across the resistor R5. This output signal is connected through suitable biasing resistors to the bases of transistors Q1, Q3, Q5, Q7, and Q9 causing them to begin to conduct.

The output of the two stage amplifier including transistors QA and QB is across resistor R5 and is fed to five parallel triggering circuits. Transistors Q1, Q3, Q5, Q7 and Q9 provide the inputs to the five triggering circuits respectively. The function of the triggering circuits is to turn on in a sequence which corresponds to an increase of overload. For a minimum overload signal, just the first trigger circuit will be on. The sequence proceeds as the signal increases so that for a maximum overload signal, all five trigger circuits will be on. The transistors Q1, Q3, Q5, Q7 and Q9 operate in a way which causes the trigger circuit that each is associated with to be turned on at the proper level of overload signal.

Transistors Q2–Q2A, Q4, Q6, Q8 and Q10–Q10A operate as switches for the five triggering circuits. With the exception of transistors Q2A and Q10A, all switching transistors are cut off during standby. Transistors Q2A and Q10A are forward biased and conducting.

The anode lead of the silicon rectifier, referred to also as a power diode, has a resistance of approximately 30 micro ohms. Note, if the resistance of the anode lead varies, trimming potentiometers will be adjusted in accordance with the variation. As current passes thru the rectifier 10, a half cycle voltage signal, corresponding to the current in shape and proportional to current in amplitude, is generated. This voltage signal is amplified by transformer T2 and transistors QA and QB. The output of the amplifier is a half cycle sine wave across resistor R5. The voltage signal across R5 is also across the inputs to transistors Q1, Q3, Q5, Q7 and Q9. As the voltage across resistor R5 starts to go positive, all five transistors just mentioned will begin to conduct. The amount each transistor conducts is determined by its biasing resistors.

When the peak current through the silicon rectifier reaches 1200 amperes, the voltage across resistor R5 will reach a peak of 1.9 volts. This level will allow transistor Q1 to conduct enough current to forward bias transistor Q2 while all other trigger circuits remain inactive. The signal which triggers transistor Q2 is a half cycle sine wave. At the minimum trigger level, transistor Q2 is triggered on only when the signal reaches a peak value, which means transistor Q2 will conduct only for a short time. The result of this short conduction time would be chatter of relay 1CR. Capacitor C3 has been placed across relay 1CR so that when transistor Q2 conducts, the capacitor will charge. When transistor Q2 is cut off, the capacitor C3 discharges through relay 1CR. The effect of capacitor C3 is not enough to prevent chatter of relay 1CR, therefore a snap action circuit has been incorporated into the transistor Q2 trigger circuit which gives increased conduction time for transistor Q2.

As transistor Q2 starts to conduct, it provides a discharge path for capacitor C2A. The discharge of C2A absorbs the current which flows through resistor R55. Since this current was supplying base drive to transistor Q2A, the discharge of C2A results in transistor Q2A being cut off. With transistor Q2A cut off, the current through resistor R54 is now diverted to the base of transistor Q2. The additional base drive to transistor Q2 sustains conduction of the transistor even though the triggering signal has started to decay. Capacitor C2A, having discharged, will now recharge through resistor R56 and in the process, supply base drive to transistor Q2A. Transistor Q2A begins to conduct which eliminates base drive to transistor Q2. Transistor Q2A then will again conduct and transistor Q2 will be cut off. This operation is repeated each cycle as transistor Q2 is triggered on. It is important to realize that transistor Q2 is cut off after each cycle of operation. The reason for this will now be explained.

Relay 1CR has been energized and will remain energized as long as the rectifier current remains at 1200 amps peak or above. The operation of relay 1CR causes capacitor C5 to charge through resistor R44. The time required to reach peak voltage for the unijunction transistor Q11 with the RC combination of R44 and C5 is 90 cycles. When peak voltage for unijunction transistor Q11 is reached, transistor Q11 will conduct and a pulse across resistor R41 will trigger the silicon controlled rectifier Q12. With rectifier Q12 conducting the overload control relay 3CR will operate. If, at any time less than 90 cycles, the rectifier current drops below 1200 amps peak, transistor Q2 will no longer be triggered on. Relay 1CR will de-energize and capacitor C5 will discharge through resistor R45.

Therefore, if the 1200 amp peak current is present for 90 cycles, the overload control relay 3CR will be actuated. If the 1200 amp peak current is present for any time duration less than 90 cycles, the overload control relay will not be actuated and the overload control will return to standby when a safe operating current is reached.

When the peak current through the silicon rectifier reaches 1450 amps, the peak voltage across resistor R5 will be at a level sufficient to cause transistor Q2 to be triggered on and in addition transistor Q3 will now conduct enough current to forward bias transistor Q4 and therefore cause transistor Q4 to be triggered on each cycle.

All circuits will operate as previously described with one exception. Each time transistor Q4 conducts, it will be drawing current through resistor R40 and causing a voltage drop across resistor R40. This voltage drop will reduce the voltage level at the junction of resistors R40 and R42. The drop will also reduce the voltage level on the base 2 (connected to resistor R42) of the unijunction transistor Q11. Since the peak voltage of a unijunction transistor (emitter voltage at which transistor conducts) depends on the base 2 voltage, a reduction of base 2 voltage results in a reduction of peak voltage. In other words, the capacitor C5 does not have to charge up to as great a voltage now to cause transistor Q11 to conduct as it previously did. The result of capacitor C5 not having to charge up as much as it previously did is that less time will be required to reach peak voltage of the unijunction transistor. If a peak rectifier current of 1450 amps is present for 60 cycles, the overload control relay will be actuated. If the 1450 amp peak current is present for any time less than 60 cycles, the overload control relay will not be actuated and the overload control will return to a standby condition when a safe operating current is reached. If the current merely decreases to another overload level, as in this case from 1450 amps to 1200 amps, the overload control will continue to function and actuate the overload control relay in 90 cycles from the time of initial overloading. Only when the overload is completely eliminated, will the timing sequence return to a zero count condition.

For a peak rectifier current of 1700 amps, all circuits will operate as described for the condition of a 1450 amp peak. In addition, transistor Q5 will conduct enough current to forward bias transistor Q6. With both transistors Q4 and Q6 being triggered on, an increased current will flow through resistor R40, causing an increased voltage drop across resistor R40. The increased voltage drop means that the voltage level at the base 2 of unijunction transistor Q11 will drop. The operation from this point on is the same as was explained for the 1450 amp overload except that less time is now required to reach peak voltage of transistor Q11. If a peak rectifier current of 1700 amps is present for 45 cycles, the overload control relay will be actuated. If the 1700 amp peak current is present for any time less than 45 cycles, the overload control will return to a standby condition when a safe operating current is reached.

For a peak rectifier current of 1950 amps, all circuits will operate as described for the condition of a 1700 amp peak. In addition, transistor Q7 will conduct enough current to forward bias transistor Q8. Now transistors Q4, Q6 and Q8 will be conducting. Once again, current flow through resistor R40 and voltage drop across resistor R40 are increased. The result of this will be an even greater drop of voltage at the base 2 of transistor Q11 which means a shorter time required to reach peak voltage of transistor Q11. The operation from this point on is the same as was explained for the 1450 amp overload except that less time is required to actuate the overload control relay. If a peak current of 1950 amps is present for 30 cycles, the overload control relay will be actuated. If the 1950 amp peak current is present for any time less than 30 cycles, the overload control will return to a standby condition when a safe operating current is reached.

The maximum overload occurs when peak rectifier current reaches 2200 amps. For this condition all previously mentioned trigger circuits will be on and in addition transistor Q9 will supply enough current to forward bias transistor Q10. The combination of transistors Q10 and Q10A plus associated circuitry comprise a snap action circuit. The operation of the snap action circuit was described for transistors Q2 and Q2A.

When transistor Q10 is triggered on, relay 2CR will be energized and remain energized as long as the 2200 amp peak rectifier current is present. It is important to remember that relay 1CR is energized. Also, transistors Q4, Q6 and Q8 are all conducting thereby causing base 2 of transistor Q11 to be at its lowest voltage level. The operation of relay 2CR permits current flow through resistor R43. The equivalent resistance of the two in parallel is much less than the original value of resistor R44. The operation of relay 2CR resulted in a new RC combination with a shorter time constant or charging time for capacitor C5. The combined result of a shorter charging time for capacitor C5 and a low voltage level at base 2 of transistor Q11 is a very short time required to reach peak voltage of transistor Q11.

If a peak current of 2200 amps is present for 2 cycles, the overload control 3CR relay will be actuated.

In all cases when the overload control relay 3CR is actuated, it will remain actuated until the reset button SW1 is pushed.

In resistance welding equipment, it is common practice to use large numbers of silicon diodes mounted in water-cooled conductive mountings. Due to the geometry of these mountings and to the variable distance from an individual silicon diode to the output terminals of the welding transformer, certain of the silicon diodes will carry more current than others. If the device of my invention is connected across the anode lead of one of the silicon diodes known to carry the most current and become most overheated, the device will thus protect all of the silicon diodes from damaging overloads without requiring monitoring devices for each of the silicon diodes.

Although the above description of my invention deals specifically with silicon diodes and with their use in resistance welding equipment, it will be understood that my invention is useful in any application where it is impractical to measure the internal temperature of an electrical device but where it is possible to estimate temperature by the power being dissipated by the electrical device.

More specifically, it is impractical to measure, directly, the temperature of the internal junction of a silicon rectifier. However, this temperature is proportional to the amperage and to the duration of current flow. Heretofore, it has been proposed to measure this current and interrupt the same if it should exceed a given level. No method has, to my knowledge, been proposed, however, which will accomplish this in a series of steps, thus permitting very high amperage current, far in excess of the continuous current carrying rating, to flow for short periods of time.

Thus it will be seen that I have provided an efficient overload circuit for protecting the silicon rectifiers of a power pack of a resistance welder from burning out as the result of excess junction temperatures, which circuit, however, is also useful in other intermittent power applications for protecting other semiconductors or current carrying elements, whose internal temperatures are difficult to determine, from burning out as the result of varying overload conditions of current and time values; furthermore, I have provided, in such circuit, a plurality of transistorized trigger circuits which are sequentially operated in response to progressively greater overload currents for progressively decreasing time periods of overload so as to interrupt current flow through the silicon rectifiers or equivalent elements if the overload is such as to tend to overheat and burn them out.

While I have illustrated and described a single specific embodiment of my invention, it will be understood that this is by way of illustration only, and that various changes and modifications may be made within the con-

I claim:

1. An electrical system including an electrical element through which intermittent currents are conducted of different magnitude and for different time periods, overload control means for interrupting the current flow through said element, signal means responsive to said currents, and circuit means responsive to said signal means for actuating said overload control means in response to any one of a plurality of different combinations of current values and time intervals of said element indicative of a predetermined abnormal temperature thereof so as to prevent overheating and damage to said element.

2. A system as recited in claim 1 wherein said element is a semi-conductor and wherein said circuit means comprises a plurality of trigger circuits sequentially triggered in response to predetermined increases in said current flow.

3. A system as recited in claim 1 wherein said element is a solid state silicon rectifier and wherein said circuit means comprises a plurality of trigger circuits sequentially triggered in response to increases in said current flow for shorter time periods, including means for integrating varying current-time intervals corresponding to the current flow through said element so as to actuate said overload control means only when said integrated current-time intervals exceed a predetermined safe value that may cause overheating of said rectifier.

4. In a system as recited in claim 1 including a power source under intermittent duty which includes said element and wherein said element is a silicon diode through which current flows which substantially exceeds its continuous rating, and wherein said signal means is voltage signal means responsive to current flow through said silicon diode, said circuit means including a plurality of trigger circuits for actuating said overload means in response to any one of a plurality of different integrated current-time intervals corresponding to said voltage signal means to limit the power consumption of said silicon diode to a predetermined safe value.

5. In combination with a welding circuit, a power source therefor including a solid state silicon rectifier, an overload control system for said rectifier, comprising an electrical voltage signal pick-up means responsive to current flow through said rectifier, a plurality of trigger circuits sequentially triggered by said voltage signal pick-up means in response to overload current-time intervals of said rectifier involving sequentially greater currents for sequentially shorter periods of time, each of which is effective to cause the same amount of overheating of said rectifier, and a control relay actuated by said voltage signal pick-up means through said trigger circuits to interrupt current flow through said rectifier upon occurrence of any of said various current-time values of overload.

6. A resistance welding circuit energized by a power source under intermittent duty including the electrodes of a silicon diode through which currents flow which are substantially greater than continuous rating, said silicon diode including an anode lead, voltage signal means responsive to the voltage drop across said anode lead, amplifying means for amplifying the signal from said voltage signal means, and means responsive to the magnitude of the amplified signal and time of flow of said currents indicative of a predetermined excessive heating of said silicon diode for interrupting current flow through said silicon diode and anode lead thereof when said magnitude and time of flow will result in said predetermined excessive heating of said silicon diode.

7. A resistance welding circuit as recited in claim 6 in which said means comprises a plurality of parallel connected trigger circuits operable sequentially in response to increasing signal currents for sequentially shorter time values so as to actuate an overload relay which will interrupt current flow through said silicon diode upon occurrence of any time-current value that would overload said silicon diode.

8. A resistance welding circuit as recited in claim 7 together with a transistor for operating said overload relay, which transistor has a base 2 electrode having a base 2 voltage which is progressively lowered as successive trigger circuits are actuated in response to progressively increasing signal currents so that progressively shorter time periods are required to actuate said transistor so as to operate said overload relay.

9. A resistance welding circuit as recited in claim 8 wherein said transistor is of the unijunction type, and wherein means are provided for resetting the overload control after triggering comprising a normally closed pushbutton switch in series with the coil of said overload relay.

10. An overload control circuit for monitoring the current flow through a silicon diode having an anode lead, comprising amplifying means whose input leads are connected to opposite extremities of said anode lead, an overload control relay, contacts actuated by said relay to interrupt the flow of current through said silicon diode, means signalling an overload condition, a silicon controlled rectifier in the energization circuit of said relay, and means to initiate conduction in said silicon controlled rectifier in response to any one of a plurality of different current-time values of overload of said silicon diode, which would overheat said silicon diode to the same, predetermined, unsafe value.

11. A circuit according to claim 10 further characterized in that said means to initiate conduction includes a unijunction transistor, a capacitor in the emitter circuit of said unijunction transistor, a charging circuit for said capacitor, and means responsive to said amplifying means to initiate charging of said capacitor, the arrangement being such that the turning on of said unijunction transistor subsequent to the charging of said capacitor initiates conduction in said silicon controlled rectifier.

12. A circuit according to claim 11 further including means responsive to the output of said amplifying means when said current reaches a predetermined level greater than said first-mentioned predetermined level to lower the base 2 electrode potential of said unijunction transistor relative to its other electrode to make the transistor conduct within a shorter time period.

13. A circuit according to claim 12 further including means responsive to the output of said amplifying means when said current reaches a level greater than said last mentioned level to increase the charging rate of said capacitor.

References Cited

UNITED STATES PATENTS

| 2,740,045 | 3/1956 | Bivens | 219—111 X |
| 3,105,920 | 10/1963 | Dewey | 317—36 |
| 3,147,400 | 9/1964 | McClay | 317—36 X |
| 3,329,869 | 7/1967 | Obenhaus | 317—33 X |
| 3,356,820 | 12/1967 | O'Neal | 219—114 |
| 3,155,879 | 11/1964 | Casey et al. | 317—33 X |

LEE T. HIX, Primary Examiner

U.S. Cl. X.R.

219—110, 114, 492, 497, 501; 317—33, 36, 148.5